(12) United States Patent
Meng et al.

(10) Patent No.: US 12,486,375 B2
(45) Date of Patent: Dec. 2, 2025

(54) POLYCARBONATE COMPOSITE ARTICLE

(71) Applicant: Covestro Deutschland AG, Leverkusen (DE)

(72) Inventors: Jiru Meng, Shanghai (CN); Hua Han, Shanghai (CN); Ke Hong, Shanghai (CN); Paula Xiong, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 566 days.

(21) Appl. No.: 17/995,315

(22) PCT Filed: Apr. 9, 2021

(86) PCT No.: PCT/EP2021/059293
§ 371 (c)(1),
(2) Date: Oct. 3, 2022

(87) PCT Pub. No.: WO2021/209335
PCT Pub. Date: Oct. 21, 2021

(65) Prior Publication Data
US 2023/0167261 A1    Jun. 1, 2023

(30) Foreign Application Priority Data

Apr. 15, 2020  (WO) ................ PCT/CN2020/084872
May 11, 2020   (EP) ..................................... 20173926

(51) Int. Cl.
*C08J 9/228* (2006.01)
*H01Q 1/42* (2006.01)

(52) U.S. Cl.
CPC .............. *C08J 9/228* (2013.01); *H01Q 1/424* (2013.01); *C08J 2369/00* (2013.01)

(58) Field of Classification Search
CPC ...... C08J 9/228; C08J 2369/00; C08J 9/0061; C08J 9/34; C08J 9/122; C08J 2203/06; C08J 2203/08; C08J 2433/06; C08J 2483/10; H01Q 1/424; H01Q 1/246; B29K 2105/165; B29C 44/14; B29C 44/42;
(Continued)

(56) References Cited

U.S. PATENT DOCUMENTS 6,107,976 A      8/2000  Purinton
2014/0357748 A1* 12/2014 Yamaoka ............... C08J 9/0061
                                                          528/370
2018/0241119 A1  8/2018  Hawthorne

FOREIGN PATENT DOCUMENTS

CN    102604187 A     7/2012
CN    106009627 A  * 10/2016 .............. C08L 75/08
(Continued)

OTHER PUBLICATIONS

International Search Report, PCT/EP2021/059293, date of mailing: Jun. 25, 2021, Authorized officer: Holger Lichau.

*Primary Examiner* — K. Boyle
(74) *Attorney, Agent, or Firm* — Donald R. Palladino

(57) ABSTRACT

The present application relates to a polycarbonate composite article, a preparation method therefor, and use thereof. The polycarbonate composite article includes a foamed polycarbonate layer and a non-foamed polycarbonate film layer on the foamed polycarbonate layer. The polycarbonate composite article according to the present invention has a reduced weight and improved signal penetration performance, and can be used as an antenna housing.

10 Claims, 1 Drawing Sheet

(58) Field of Classification Search
CPC ........ B29C 45/1671; B29C 2105/0026; B32B 2250/02; B32B 2266/0264; B32B 2270/00; B32B 2307/3065; B32B 2307/402; B32B 2307/406; B32B 2307/41; B32B 2307/558; B32B 2307/71; B32B 2307/714; B32B 2307/718; B32B 2307/72; B32B 2307/7265; B32B 2307/734; B32B 2457/00; B32B 5/00; B32B 27/18; B32B 27/365; B32B 27/065
See application file for complete search history.

(56) References Cited

FOREIGN PATENT DOCUMENTS

| | | | | |
|---|---|---|---|---|
| CN | 111421937 | A | 7/2020 | |
| EP | 1090744 | B1 * | 6/2007 | ............... B32B 5/18 |
| JP | 108174780 | A | 7/1996 | |
| JP | H08183054 | A | 7/1996 | |
| JP | H11198331 | A | 7/1999 | |
| JP | H11300866 | A | 11/1999 | |
| JP | 2015117274 | A | 6/2015 | |

* cited by examiner

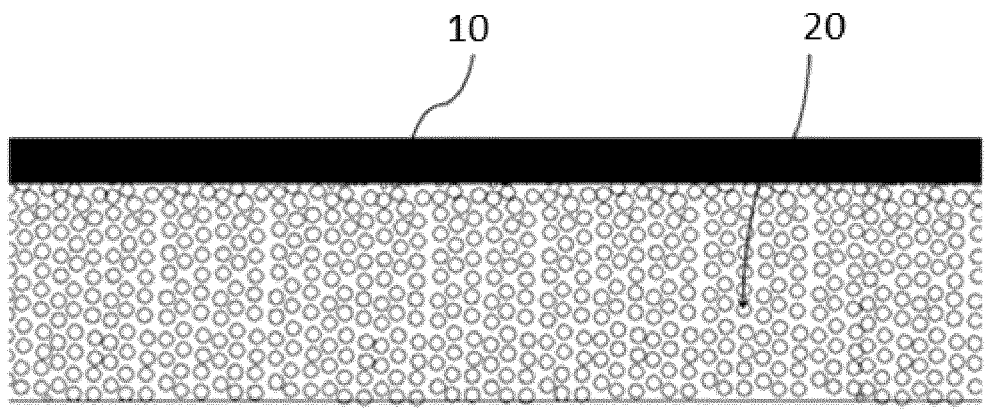

POLYCARBONATE COMPOSITE ARTICLE

CROSS REFERENCE TO RELATED APPLICATIONS

This application is a national stage application under 35 U.S.C. § 371 of PCT/EP2021/059293, filed Apr. 9, 2021, which claims benefit of EP Application Serial No. 20173926.5, filed May 11, 2020, and PCT/CN2020/084872, filed Apr. 15, 2020, all of which are incorporated herein by reference in their entireties.

TECHNICAL FIELD

The present invention belongs to the field of polymer composite. Specifically, the present invention relates to a polycarbonate composite article, in particular suitable for an antenna housing, a preparation method therefor, and use thereof.

BACKGROUND ART

The 5G technology is the coming fifth generation wireless mobile communication technology. 5G wireless networks will support 1,000-fold gains in capacity, connections for at least 100 billion devices, and a 10 Gb/s individual user experience capable of extremely low latency and response times. 5G is the backbones for Artificial Intelligence (AI), Internet of Things (IOT), automation, connected cars, Remote healthcare, smart city, etc. The deployment of these networks will emerge between 2020 and 2030.

Different from 4G technology, 5G technology would employ active antenna unit [AAU] rather than passive antenna unit. The design of active antenna substantially increases the weight of the final antenna part. Considering the loading weight of the pole, the stability of the antenna under strong winds, and the high installation and maintenance costs, the reduced weight of the active antenna becomes particularly important, especially for macro base station antenna, where the part size is quite big. Furthermore, the dimensional stability is also critical due to the big size of antenna housing.

5G can cover a broad range of waves, including middle band lower than 6 GHz, and millimeter wave higher than 24 GHz. Due to the high attenuation of higher frequency electromagnetic waves when they encounter obstacles during transmission, high signal transmission would be one of the key requirements for the antenna protective materials to be used for 5G technology.

Better signal transmission performance means that the dielectric constant Dk and loss factor Df of the material are low and stable under a wide range of frequencies and environmental conditions. If the antenna housing has a two-layer or multi-layer structure, S11 (return loss) and S21 (gain) are commonly used indicators to characterize the transmission performance of the antenna, and its unit is dB.

There are some patent documents related to the antenna housing. For example, U.S. Pat. No. 4,896,164 describes a conventional tuned layered antenna housing structure (FIG. 2), wherein the inner and outer layers of polyester resin/E-grade glass (glass fiber) laminates are placed on the front and rear sides of a rigid polyimide foam respectively, and there are specific thicknesses selected with respect to the conventional reflection elimination. Although the tuned layered antenna housing structure has significantly improved broadband characteristics in terms of insertion loss and return loss, the insertion loss is minimal at 36 GHz in the range of 6-42 GHz, but the tuned structure cannot be used effectively beyond two narrow bandwidths (8-12 GHz) and (27-31 GHz).

US2018/0241119 described a multi-wall radar antenna shield, which not only provides high penetration of microwave signals, but also protects the antenna shield from the threat of flying objects. However, because of the complexity of the composite system and the multi-layers/multi-walls, the composite system of the whole antenna housing is more complex. Similarly, the tuned structure cannot be effectively used beyond two 4 kHz narrowed bandwidth (8-12 kHZ and 26-30 kHz).

Therefore, there is still a need in 5G-related applications for antenna housings that have improved signal penetration performance, dimensional stability, and lightweight.

SUMMARY OF THE INVENTION

Therefore, an object of the present invention is to provide an antenna housing, which has improved signal penetration performance, dimensional stability, and lightweight.

Another object of the present invention is to provide a method for preparing an antenna housing.

According to a first aspect of the present invention, provided is a polycarbonate composite article, comprising:
a non-transparent foamed polycarbonate layer; and
a non-foamed polycarbonate film layer on the foamed polycarbonate layer;
wherein
the foamed polycarbonate layer comprises a polycarbonate resin, an impact modifier and an optional flame retardant,
the non-foamed polycarbonate film layer comprises a polycarbonate resin and an optional UV stabilizer, and has a thickness of 0.2-1.00 mm;
the ratio of the thickness of the non-foamed polycarbonate film layer to the thickness of the foamed polycarbonate layer is in the range of 1: 3-1:20;
the polycarbonate composite article does not comprise an inorganic reinforcement material.

According to a second aspect of the present invention, provided is a method for preparing a polycarbonate composite article according to the present invention, comprising the following steps:
placing the non-foamed polycarbonate film on the inner surface of an injection mold and closing the mold to form a cavity; and
forming the foamed polycarbonate layer by injecting and foaming a melted polycarbonate composition comprising a polycarbonate resin, an impact modifier and an optional flame retardant in the cavity.

According to a third aspect of the present invention, provided is use of a polycarbonate composite article according to the present invention as an antenna housing.

The polycarbonate composite article according to the present invention can achieve improved signal penetration performance, dimensional stability, and can achieve weight reduction, by combining a foamed polycarbonate layer and a non-foamed polycarbonate film layer.

BRIEF DESCRIPTION OF DRAWINGS

The present invention is explained in more details below with reference to the accompanying drawings, wherein:

FIG. 1 shows a schematic diagram of a polycarbonate composite article according to one embodiment of the invention, where 10 indicates a non-foamed polycarbonate film layer and 20 indicates a foamed polycarbonate layer.

DETAILED DESCRIPTION OF THE INVENTION

Some specific embodiments of the invention will now be described with reference to the drawings for purposes of illustration and not limitation.

The descriptions of the various features in this application can be combined with each other when there is no contradiction, and all fall within the protection scope claimed in this application.

Unless defined otherwise, all technical and scientific terms used herein have the same meaning as commonly understood by one of ordinary skill in the art to which this invention belongs. When the definitions of the terms in this specification conflict with the meanings commonly understood by those skilled in the art to which the present invention pertains, the definitions described herein shall prevail.

According to the first aspect of the present invention, provided is a polycarbonate composite article, comprising:
a non-transparent foamed polycarbonate layer; and
a non-foamed polycarbonate film layer on the foamed polycarbonate layer;
wherein
the foamed polycarbonate layer comprises a polycarbonate resin, an impact modifier and an optional flame retardant,
the non-foamed polycarbonate film layer comprises a polycarbonate resin and an optional UV stabilizer, and has a thickness of 0.2-1.0 mm;
the ratio of the thickness of the non-foamed polycarbonate film layer to the thickness of the foamed polycarbonate layer is in the range of 1: 3-1:20;
the polycarbonate composite article does not comprise an inorganic reinforcement material.

FIG. 1 shows a schematic diagram of a polycarbonate composite article according to one embodiment of the invention, where 10 indicates a non-foamed polycarbonate film layer and 20 indicates a foamed polycarbonate layer. It should be understood FIG. 1 is used for illustration rather limitation.

The foamed polycarbonate is non-transparent. According to the invention, the feature of non-transparency is defined in that the respective material has a light transmission according to EN ISO 13468-2:2006 of less than 5%, preferably less than 1%, most preferred less than 0.1%, measured at a layer thickness of 10 mm, respectively.

Preferably, the thickness of the foamed polycarbonate layer is in the range of 1.5-10.0 mm, preferably 2.0-6.0 mm, and more preferably 2.0-4.0 mm.

Preferably, the thickness of the non-foamed polycarbonate film layer is in the range of 0.2-0.6 mm, such as 0.2-0.5 mm.

The ratio of the thickness of the non-foamed polycarbonate film layer to that of the foamed polycarbonate layer is important in order to achieve good signal penetration performances.

Preferably, the ratio of the thickness of the non-foamed polycarbonate film layer to the thickness of the foamed polycarbonate layer is in the range of 1: 3-1:15.

Those skilled in the art can select the types and amounts of impact modifiers, flame retardants and UV stabilizers as needed.

For example, the impact modifier may be one or more selected from the following: butadiene- or styrene-butadiene rubber based and methyl methacrylate-styrene grafted impact modifiers having a core-shell structure (MBS), silicone-acrylate rubbers having a core-shell structure, acrylate rubber-based core-shell impact modifiers, and the like.

Preferably, the butadiene- or styrene-butadiene rubber-based core-shell impact modifiers are butadiene- or styrene-butadiene rubber-based impact modifiers grafted with methyl methacrylate or methyl methacrylate-styrene copolymers, e.g. Kane Ace M732 available from Kaneka, and Paraloid™ EXL2650J, EXL2690 and EXL2691J available from Dow Chemicals, and the like.

Suitable siloxane-acrylate rubbers having a core-shell structure may be produced from alkyl methacrylates and/or alkyl acrylates, crosslinkers, and grafting agents. In this context, exemplary and preferred alkyl methacrylates and/or alkyl acrylates are $C_1$ to $C_8$-alkyl esters, e.g., methyl ester, ethyl ester, n-butyl ester, tert-butyl ester, n-propyl ester, n-hexyl ester, n-octyl ester, n-lauryl ester, and 2-ethylhexyl ester; haloalkyl esters, preferably halo $C_1$ to $C_8$-alkyl esters, e.g., chloroethyl acrylate, and mixtures of these monomers. Particularly preferred is n-butyl acrylate.

A monomer having more than one polymerizable double bond can be used as the crosslinker for the polyalkyl(meth)acrylate-rubber component of siloxane-acrylate rubber. Preferred examples of the crosslinking monomers are esters of unsaturated monocarboxylic acids having 3 to 8 carbon atoms and unsaturated monohydric alcohols having 3 to 12 carbon atoms or saturated polyols having 2 to 4 OH-groups and 2 to 20 carbon atoms, e.g., ethylene glycol dimethacrylate, propanediol dimethacrylate, 1,3-butanediol dimethacrylate, and 1,4-butanediol dimethacrylate. Such crosslinkers may be used alone or as mixtures of at least two crosslinkers.

Exemplary and preferred grafting agents are allyl methacrylate, triallylcyanurate, triallylisocyanurate or mixtures thereof. The allyl methacrylate may further be used as the crosslinker. Such grafting agents may be used alone or as mixtures of at least two grafting agents.

The crosslinker and grafting agent are present in an amount of from 0.1 wt % to 20 wt % based on the total weight of the polyalkyl(meth)acrylate-rubber component of siloxane-acrylate rubber.

Preferred siloxane-acrylate rubbers suitable to be used are, for example, Metablen S-2100, S-2001, S-2006 and the like available from Mitsubishi Rayon, and Kane Ace MR-01 from Kaneka Corporation.

It is preferred that the acrylate rubber-based core-shell impact modifiers are acrylate rubber-based impact modifiers grafted with methyl methacrylate, including Paraloid™ EXL2311, EXL2313, EXL2315, EXL2300, EXL2330 and EXL2390 available from Dow Chemicals; and Durastrength® 410, 440 and 480 available from Arkema.

Particularly preferred is a silicone-acrylate rubber-based core-shell impact modifier to improve low-temperature impact resistance.

The above-mentioned impact modifiers can be used alone or in combination.

The amount of the impact modifier preferably is 1.0 wt % to 8.0 wt % and more preferably from 1.0 wt % to 6.0 wt %, particularly preferably from 2.0 wt % to 5.0 wt % relative to the weight of the foamed polycarbonate layer.

The flame retardant may be a flame retardant commonly used in the field of polycarbonate materials, such as organic phosphorus-based flame retardants, such as bisphenol A bis (diphenyl phosphate) (BDP), triphenyl phosphate (TPP), phosphazene, and resorcinol bis (diphenyl phosphate) (RDP).

The above-mentioned flame retardants can be used alone or in combination.

If presents, the flame retardant is preferably present in an amount ranging from 1.0 wt % to 5.0 wt %, and more preferably from 1.5 wt % to 3.0 wt %, relative to the weight of the foamed polycarbonate layer.

The UV stabilizer may be an UV stabilizer commonly used in the field of polycarbonate materials.

Suitable UV stabilizers are described, for example, in EP 1 308 084 A1, DE 102007011069 A1, and DE 10311063 A1.

Particularly suitable UV stabilizers are hydroxybenzotriazoles such as 2-(3',5'-bis(1,1-dimethylbenzyl)-2'-hydroxyphenyl) benzotriazole (Tinuvin@ 234, BASF SE, Ludwigshafen), 2-(2'-hydroxy-5'-(tert-octyl)phenyl) benzotriazole (Tinuvin® 329, BASF SE, Ludwigshafen), 2-(2'-hydroxy-3'-(2-butyl)-5'-(tert-butyl)phenyl)benzotriazole (Tinuvin® 350, BASF SE, Ludwigshafen), bis(3-(2H-benzotriazolyl)-2-hy-droxy-5-tert-octyl)methane (Tinuvin® 360, BASF SE, Ludwigshafen), 2-(4,6-diphenyl-1,3,5-triazin-2-yl)-5-(hexyloxy)phenol (Tinuvin® 1577, BASF SE, Ludwigshafen), and also the benzophenones 2,4-dihydroxybenzophenone (Chimasorb® 22, BASF SE, Ludwigshafen) and 2-hydroxy-4-(octyloxy)benzophenone (Chimasorb® 81, BASF SE, Ludwigshafen), 2-propenoic acid, 2-cyano-3,3-biphenyl, 2,2-bis [[(2-cyano-1-oxo-3,3-diphenyl-2-propenyl)oxy]methyl]-1,3-propanediyl ester (9CI) (Uvinul® 3030, BASF SE, Ludwigshafen), 2-[2-hydroxy-4-(2-ethylhexyl)oxy]phe-nyl-4,6-di(4-phenyl)phenyl-1,3,5-triazine (Tinuvin® 1600, BASF SE, Ludwigshafen) or tetraethyl 2,2'-(1,4-phe-nylenedimethylidene)bismalonate (Hostavin® B-Cap, Clariant AG). Mixtures of these UV stabilizers can also be used.

If presents, the UV stabilizer is preferably present in an amount ranging from 0.10 wt % to 1.00 wt % and more preferably from 0.10 wt % to 0.50 wt %, particularly preferred from 0.10 wt % to 0.30 wt %, relative to the weight of the non-foamed polycarbonate layer.

Preferably, the foamed polycarbonate layer and the non-foamed polycarbonate film layer comprise a same polycarbonate resin, so that the adhesion between foamed polycarbonate layer and the non-foamed polycarbonate film layer is better.

In some embodiments, the polycarbonate composite article consists of the foamed polycarbonate layer and the non-foamed polycarbonate film layer.

In some embodiments, the density of the foamed polycarbonate layer is 0.80-1.18 g/cm$^3$.

The lightweight and reduced signal loss can be achieved through the cells in the foamed polycarbonate layer.

A non-foamed polycarbonate film can be placed into the mold cavity and adhere onto the inner surface of the mold, and then a polycarbonate composition comprising a polycarbonate resin, impact modifier and optional flame retardant can be injected into the cavity and foamed to form a foamed polycarbonate layer, thereby the polycarbonate composite article according to the present invention can be formed without using additional adhesives.

Therefore, in some embodiments, there is no adhesive between the non-foamed polycarbonate film layer and the foamed polycarbonate layer.

The non-foamed polycarbonate film layer in the polycarbonate composite article of the present invention can meet various appearance requirements, such as high gloss, different colors, and different decorative patterns can be realized on the film layer. In addition, the non-foamed polycarbonate film layer can provide waterproof, ultraviolet resistance, weather resistance, impact resistance, flame resistance and other properties according to the application needs. It can be used outdoors or indoors to meet relevant performance requirements.

Compared with the existing non-foamed polycarbonate article with the same thickness, the polycarbonate composite article of the present invention can achieve improved signal penetration performance, better dimensional stability, and lightweight by a combination of a foamed polycarbonate layer and a non-foamed polycarbonate film layer.

The signal loss during the transmission of electromagnetic waves in the medium is affected by many factors. For the housing as the transmission medium, in addition to the thickness and the distance from the housing to the antenna, the dielectric constant Dk and loss factor Df of the material are two particularly critical factors. Dk is a macro-physical quantity indicating the degree of polarization of a medium, and the capacity of the medium to store electric energy, thereby characterizing the ability to hinder signal transmission. Df is a physical quantity indicating the capability of the dielectric causing signal loss. The higher Dk, the higher Df, which indicates that the capability of the medium blocking signal transmission is stronger, and the more signal transmission loss is. For 5G signals, especially millimeter waves, Dk and Df of the antenna housing material need to be reduced to lower the signal loss. If the antenna housing has a two-layer or multi-layer structure, S11 (return loss) and S21 (gain) are commonly used indicators to characterize the transmission performance of the antenna as mentioned previously, and its unit is dB.

Compared with the existing polycarbonate article with the same thickness, the polycarbonate composite article according to the present invention has relatively low return loss (S11) and gain loss (S21).

According to the second aspect of the present invention, provided is a method for preparing a polycarbonate composite article according to the present invention, comprising the following steps:
  placing the non-foamed polycarbonate film on the inner surface of an injection mold and closing the mold to form a cavity; and
  forming the foamed polycarbonate layer by injecting and foaming a melted polycarbonate composition comprising a polycarbonate resin, an impact modifier and an optional flame retardant in the cavity.

Through the above methods, design freedom can be achieved. For example, different thicknesses of non-foamed polycarbonate films can be selected, and foamed polycarbonate layers having a desired thickness, cell size, and density can also be formed by injection foaming.

A polycarbonate composition comprising a polycarbonate resin, an impact modifier and an optional flame retardant can be obtained by first mixing polycarbonate pellets with the impact modifier and an optional flame retardant before being melted.

The injection foaming process can be physical foaming process and chemical foaming process based on the foaming mechanism. The physical foaming process utilizes physical means to foam plastics. There are mainly two means: the first means involves mixing the supercritical fluid (generally $N_2$ or $CO_2$) with the polymer melt under high pressure to form single-phase solution; then injecting this single-phase solution into the cavity and bubbles nucleate to form bubble seeds due to pressure drop in the cavity; bubble seeds continue to grow and create the internal cellular structure as the mold cools down; and then forming a foamed part with cell size of around 5-100 microns after solidification.

The second means involves adding hollow spheres into plastics to form a foam, thereby generating the foaming effect.

Preferably, Trexel's MuCell® foaming technology is used to conduct the physical foaming with nitrogen $N_2$ as supercritical fluid. Nitrogen is the most widely used physical foaming agent. Compared with carbon dioxide ($CO_2$), the dosage of nitrogen ($N_2$) is about 75% lower under the same weight loss condition. At the same time, nitrogen ($N_2$) can provide more uniform cell structure and is a stronger foaming agent.

The chemical foaming process utilizes a chemical reaction for the generation of gas to foam plastics. The foaming is accomplished by introducing a chemical blowing agent into the plastic pellets, and decomposing the chemical blowing agent by heating the injection molding barrel and by the screw shearing heat to release gas. Moreover, the foaming can also be accomplished by using the gas released by the chemical reaction between each component in the plastic composition.

The chemical blowing agent may be a powder or formed foam particles. The particle foaming agent can be, for example, XO-331 from Bergen or Hydrocerol® from Clariant Company. In the injection molding process, these cells continue to grow until the mold cavity is fully filled and cools down and forming final cells.

The injection foaming process can reduce the internal stress and deformation of the article obtained. Bubble grows uniformly throughout the cavity and can reduce the shrinkage of the article obtained. Therefore, the deformation of the polycarbonate composite article formed is greatly reduced, and the dimensional stability is good.

The desired weight reduction can be achieved by adjusting the injection process parameters.

The inventors have found that a composite article having an isotropic non-foamed polycarbonate film layer and a low-density foamed polycarbonate layer can be used an antenna housing with sufficient strength, so that a single antenna housing can be used for a wide range of electromagnetic wave bands.

Therefore, according to the third aspect of the present invention, provided is use of a polycarbonate composite article according to the present invention as an antenna housing.

When the polycarbonate composite article according to the present invention used as an antenna housing, the non-foamed polycarbonate film layer is an outer layer exposed to an external environment, and the foamed polycarbonate layer is an inner layer close to an antenna.

The antenna housing according to the present invention can be used as a protective housing for large outdoor antennas, small indoor antennas, and antennas of portable electrical and electronic equipment.

Particularly, the antenna housing according to the present invention can be used as a 5G antenna housing.

The antenna housing according to the present invention can protect the 5G antenna from the sun, the rain and snow, the hail and wind after being installed outdoors.

The polycarbonate composite article can be designed into desired contour with appropriate size, so as to be used in many applications including antenna housings. When used as an antenna housing, the antenna housing may be provided with a contour of a rectangular parallelepiped, cube, semi-ellipsoid, semi-sphere, etc.

The non-foamed polycarbonate film layer provides UV and/or impact resistance, and prevents moisture from being absorbed into the foamed polycarbonate layer. The presence of moisture may reduce mechanical and electrical performances of the antenna housing. The non-foamed polycarbonate layer provides structural strength that corresponds to the strength and/or stiffness required under the expected environmental conditions at the desired installation location of the antenna.

Compared with the conventional polycarbonate antenna housing, the antenna housing according to the present invention can reduce the signal loss of electromagnetic waves in the 5G band and provide a weight reduction of 5%-20%.

EXAMPLES

The concept, specific structure, and technical effects of the present invention will be further described with reference to examples, so that those skilled in the art can fully understand the objects, features, and effects of the present invention. Those skilled in the art can easily understand that the examples herein are only for illustrative purposes, and the scope of the invention is not limited thereto.

Equipment

An ENGEL 260-ton injection molding machine was used, which integrates a Mucell® physical foaming system from Trexel.

Raw Materials

The non-foamed polycarbonate films, with thicknesses of 0.25 mm, 0.5 mm, 1 mm and 2 mm, respectively, are from Covestro Polymers (China) Co., Ltd., with the designation Makrofol® DE1-4.

The injection molding raw material for foamed polycarbonate layer is a polycarbonate composition from Covestro Polymers (China) Co., Ltd., which contains 3.5 wt % of Kane Ace MR-01, an impact modifier from Kaneka Corporation, and 2.0 wt % of phosphazene relative to the weight of the polycarbonate composition.

The supercritical fluid is nitrogen ($N_2$).

Measurements

The tensile modulus and yield stress were tested according to ISO 527-2:2012.

Dielectric constant Dk and loss factor Df were tested according to ASTM D150 with 16451B Dielectric Test Fixture from Keysight technologies, wherein the Keysight resonant cavity method was used in the frequency range of 1.1 GHz-15.0 GHz, and the Keysight waveguide transmission line method was used in the frequency range of 18.0 GHz-50.0 GHz.

The simulation process was based on a version of CTS STUDIO SUITE 2014 (CST Microwave Studio) authorized by Southeast University. In the simulation process, the actual material characteristics were used, for example, copper was used for metal feed structure. The measured Dk and Df of non-foamed polycarbonate film and foamed polycarbonate layer were used as the input data for the antenna housing, and the analog output data is S11 and S21. S11 is one of the S parameters, which indicates the return loss characteristics. This parameter indicates the transmission efficiency of the antenna. The higher the value, the greater the energy reflected by the antenna itself, and the worse the transmission efficiency of the antenna. S21 is the forward transmission coefficient, that is, the gain, the higher the value, the better the transmission efficiency of the antenna.

Comparative Example 1 (CE1)

A melted polycarbonate composition containing no supercritical fluid was injected into a mold cavity and a non-foamed PC film product with a thickness of 4 mm and a density of 1.2 g/cm³ was obtained. Injection molding process parameters were shown in Table 1.

The appearance, mechanical properties, signal transmission performance, and simulation results of the non-foamed PC product were shown in Table 2 and Table 3, respectively.

Comparative Example 2 (CE2)

A melted polycarbonate composition containing the supercritical fluid (N₂) was injected into the mold cavity, and the injection process was adjusted so that the weight reduction of 7 wt % compared with the non-foamed polycarbonate product as obtained in Comparative example 1 was achieved, and a foamed polycarbonate product with a thickness of 4 mm and a density of 1.12 g/cm³ was obtained. Injection foaming process parameters used were shown in Table 1.

The appearance, mechanical properties, signal transmission performance, and simulation results of the product were shown in Table 2 and Table 3, respectively.

Comparative Example 3 (CE3)

A melted polycarbonate composition containing the supercritical fluid (N₂) was injected into the mold cavity, and the injection process was adjusted so that the weight reduction of 15 wt % compared with the non-foamed polycarbonate product as obtained in Comparative example 1 was achieved, and a foamed polycarbonate product with a thickness of 4 mm and a density of 1.02 g/cm³ was obtained. Injection foaming process parameters used were shown in Table 1.

The appearance, mechanical properties, signal transmission performance, and simulation results of the product were shown in Table 2 and Table 3, respectively.

Comparative Example 4 (CE4)

A non-foamed polycarbonate film with a thickness of 2.00 mm was cut and placed on the inner surface of the mold. A melted polycarbonate composition containing the supercritical fluid (N₂) was injected into the mold cavity, and the injection process was adjusted so that the weight reduction of 7.5 wt % compared with the non-foamed polycarbonate product as obtained in Comparative example 1 was achieved, and a two-layer polycarbonate composite product with a thickness of 4 mm and an average density of 1.11 g/cm³ was obtained. Injection foaming process parameters were shown in Table 1.

The appearance, mechanical properties, signal transmission performance, and simulation results of the product were shown in Table 2 and Table 3, respectively.

Invention Example 1 (IE1)

A non-foamed polycarbonate film with a thickness of 0.25 mm was cut and placed on the inner surface of the mold. A melted polycarbonate composition containing the supercritical fluid (N₂) was injected into the mold cavity. The injection foaming process was adjusted so that the weight reduction of 7 wt % compared with the non-foamed polycarbonate product as obtained in Comparative example 1 was achieved, and a two-layer polycarbonate composite product with a thickness of 4 mm and an average density of 1.12 g/cm³ was obtained. Injection foaming process parameters were shown in Table 1.

The appearance, mechanical properties, signal transmission performance, and simulation results of the product were shown in Table 2 and Table 3, respectively.

Invention Example 2 (IE2)

A non-foamed polycarbonate film with a thickness of 0.50 mm was cut and placed on the inner surface of the mold. A melted polycarbonate composition containing the supercritical fluid (N₂) was injected into the mold cavity, and the injection foaming process was adjusted so that the weight reduction of 7 wt % compared with the non-foamed polycarbonate product as obtained in Comparative example 1 was achieved. A two-layer polycarbonate composite product with a thickness of 4 mm and an average density of 1.13 g/cm³ was obtained. Injection foaming process parameters were shown in Table 1.

The appearance, mechanical properties, signal transmission performance, and simulation results of the product were shown in Table 2 and Table 3, respectively.

Invention Example 3 (IE3)

A non-foamed polycarbonate film with a thickness of 0.25 mm was cut and placed on the inner surface of the mold. A melted polycarbonate composition containing the supercritical fluid (N₂) was injected into the mold cavity, and the injection foaming process was adjusted so that the weight reduction of 15 wt % compared with the non-foamed polycarbonate product as obtained in Comparative example 1 was achieved. A two-layer polycarbonate composite product with a thickness of 4 mm and an average density of 1.03 g/cm³ was obtained. Injection foaming process parameters were shown in Table 1.

The appearance, mechanical properties, signal transmission performance, and simulation results of the product were shown in Table 2 and Table 3, respectively.

Invention Example 4 (IE4)

A non-foamed polycarbonate film with a thickness of 0.50 mm was cut and placed on the inner surface of the mold. A melted polycarbonate composition containing the supercritical fluid (N₂) was injected into the mold cavity, and the injection foaming process was adjusted so that the weight reduction of 13 wt % compared with the non-foamed polycarbonate product as obtained in Comparative example 1 was achieved, and a two-layer polycarbonate composite product with a thickness of 4 mm and an average density of 1.04 g/cm³ was obtained. Injection molding process parameters were shown in Table 1.

The appearance, mechanical properties, signal transmission performance, and simulation results of the product were shown in Table 2 and Table 3, respectively.

Invention Example 5 (IE5)

A non-foamed polycarbonate film with a thickness of 1.00 mm was cut and placed on the inner surface of the mold. A melted polycarbonate composition containing the supercritical fluid (N₂) was injected into the mold cavity, and the injection foaming process was adjusted so that the weight reduction of 11 wt % compared with the non-foamed polycarbonate product as obtained in Comparative example 1 was achieved. A two-layer polycarbonate composite product with a thickness of 4 mm and an average density of 1.07 g/cm³ was obtained. Injection foaming process parameters were shown in Table 1.

The appearance, mechanical properties, signal transmission performance, and simulation results of the product were shown in Table 2 and Table 3, respectively.

TABLE 1

Process parameters used in Comparative Examples (CE1-CE4) and Invention Examples (IE1-IE5)

| | CE1 | CE2 | CE3 | CE4 | IE1 | IE2 | IE3 | IE4 | IE5 |
|---|---|---|---|---|---|---|---|---|---|
| Film thickness (mm) | 4 | 0 | 0 | 2 | 0.25 | 0.5 | 0.25 | 0.5 | 1.0 |
| Average density (g/cm$^3$) | 1.2 | 1.12 | 1.02 | 1.11 | 1.12 | 1.13 | 1.03 | 1.04 | 1.07 |
| Melt Temperature (° C.) | | | | | 275 | | | | |
| Mold Temperature (° C.) | | | | | 80 | | | | |
| Injection speed.(mm/s) | | | | | 60 | | | | |
| Injection Time (s) | 3.71 | 3.07 | 2.51 | 1.95 | 3.01 | 2.97 | 2.32 | 2.13 | 2.01 |
| Packing pressure (bar) | 120 | 20 | 20 | 20 | 20 | 20 | 20 | 20 | 20 |
| Packing time (s) | 5 | 0.5 | 0.5 | 0.5 | 0.5 | 0.5 | 0.5 | 0.5 | 0.5 |
| Cooling time/Cycle time (s) | 30/52 | 20/40 | 20/42 | 200/42 | 20/40 | 20/40 | 20/42 | 20/42 | 200/42 |
| Metering Stroke (mm) | 52 | 27 | 40 | 36 | 27 | 26 | 40 | 38 | 36 |
| MuCell process pressure (MPP)* (bar) | / | 150 | 150 | 150 | 150 | 150 | 150 | 150 | 150 |
| Gas injection position (mm) | / | 10-25 | 10-27 | 10-25 | 10-24 | 10-23 | 10-26 | 10-25 | 10-25 |
| Gas injection time (s) | / | 6.45 | 6.77 | 6.34 | 6.3 | 6.13 | 6.52 | 6.43 | 6.39 |

MuCell process pressure (MPP)*: during plasticization phase, the pressure is applied to the end of the screw during gas injection in order to generate and maintain single phase solution.

TABLE 2

Properties of products obtained in Comparative Examples (CE1-CE4) and Invention Examples (IE1-IE5)

| Example | Average density (g/cm$^3$) | Thickness of foamed layer ( mm) | Film thickness (mm) | Thickness ratio of film to foamed layer | Tensile modulus (MPa) | Yield stress (MPa) | Appearance |
|---|---|---|---|---|---|---|---|
| CE1 | 1.2 | 0 | 4 | / | 2.25 × 10$^3$ | 57.6 | No surface defect |
| CE2 | 1.12 | 4 | 0 | / | 2.01 × 10$^3$ | 50.5 | Flow mark on product surface |
| CE3 | 1.02 | 4 | 0 | / | 1.86 × 10$^3$ | 46.3 | Flow mark on product surface |
| CE4 | 1.11 | 2 | 2 | 1:1 | 2.14 × 10$^3$ | 53.7 | No defect on film surface |
| IE1 | 1.12 | 3.75 | 0.25 | 1:15 | 2.03 × 10$^3$ | 51 | No defect on film surface |
| IE2 | 1.13 | 3.5 | 0.5 | 1:7 | 2.06 × 10$^3$ | 51.7 | No defect on film surface |
| IE3 | 1.03 | 3.75 | 0.25 | 1:15 | 1.91 × 10$^3$ | 47.4 | No defect on film surface |
| IE4 | 1.04 | 3.5 | 0.5 | 1:7 | 1.94 × 10$^3$ | 48.8 | No defect on film surface |
| IE5 | 1.07 | 3.0 | 1.0 | 1:3 | 2.10 × 10$^3$ | 52.0 | No defect on film surface |

It can be seen from Table 2 that, as compared with the product prepared in Comparative Example 1 (CE1), the foamed polycarbonate products without PC film prepared from Comparative Examples 2 (CE2) and Comparative Examples 3 (CE3) can achieve a weight reduction of 7 wt % to 15 wt % respectively, but there are obvious flow marks on the surface of the products, and the mechanical properties are also significantly reduced.

It can be seen from Table 2 that, the two-layer polycarbonate composite products prepared in Invention Example 1 (IE1) and Invention Example (IE2) not only have improved mechanical properties with the same weight reduction as those in Comparative Examples 2 (CE2), but also have a good product surface quality without surface defects. As compared with the product prepared from Comparative Examples 3 (CE3), the two-layer polycarbonate composite products prepared in Invention Examples 3-5 (IE3-IE5) have improved mechanical properties. Moreover, the surfaces of the obtained polycarbonate composite products in Invention Example 3-5 (IE3-IE5) are smooth and flawless, and have good appearance.

TABLE 3

Dk, Df, S11 and S21 of products obtained in Comparative Examples (CE1-CE4) and Invention Examples (IE1-IE5)

| Examples | Average density (g/cm³) | Film thickness (mm) | Thickness ratio of film to foamed layer | Testing frequency = 5.0 GHz | | | Testing frequency = 28 GHz | | | Testing frequency = 39 GHz | | |
|---|---|---|---|---|---|---|---|---|---|---|---|---|
| | | | | Dk | Df | S11/S21 (dB) | Dk | Df | S11/S21 (dB) | Dk | Df | S11/S21 (dB) |
| CE1 | 1.2 | 4 | / | 2.77 | 0.0058 | −9.37/−0.65 | 2.75 | 0.0060 | −9.30/−0.68 | 2.74 | 0.0063 | −9.12/−0.70 |
| CE2 | 1.12 | 0 | / | 2.66 | 0.0052 | — | 2.65 | 0.0053 | — | 2.65 | 0.0056 | — |
| CE3 | 1.02 | 0 | / | 2.34 | 0.0047 | — | 2.34 | 0.0048 | — | 2.34 | 0.0049 | — |
| CE4 | 1.11 | 2 | 1:1 | — | — | −9.56/−0.61 | — | — | −9.58/−0.59 | — | — | −9.50/−0.63 |
| IE1 | 1.12 | 0.25 | 1:15 | — | — | −10.23/−0.54 | — | — | −10.1/−0.58 | — | — | −10.1/−0.60 |
| IE2 | 1.13 | 0.50 | 1:7 | — | — | −10.05/−0.56 | — | — | −10.0/−0.60 | — | — | −9.8/−0.60 |
| IE3 | 1.03 | 0.25 | 1:15 | — | — | −13.47/−0.29 | — | — | −13.37/−0.30 | — | — | −13.36/−0.30 |
| IE4 | 1.04 | 0.50 | 1:7 | — | — | −12.42/−0.35 | — | — | −12.32/−0.37 | — | — | −12.30/−0.39 |
| IE5 | 1.07 | 1.0 | 1:3 | — | — | −10.06/−0.55 | — | — | −10.03/−0.56 | — | — | −10.01/−0.59 |

It can be seen from Table 3, as compared with the product prepared from Comparative Example (CE 1), the two-layer polycarbonate composite products prepared in Invention Examples (IE 1-IE 5) have different antenna echoes at different frequencies. The values of the return loss (S11) of the two-layer polycarbonate composite products prepared in Invention Examples (IE 1-IE 5) are relatively lower, and the value of the gain (S21) are relatively higher, indicating that the polycarbonate composite articles of the present invention have improved signal penetration performance, as compared with a non-foamed polycarbonate product.

As compared with the product prepared in Comparative Example 4 (CE 4) with a thickness ratio of the non-foamed polycarbonate film layer to the foamed polycarbonate layer of 1:1, the two-layer polycarbonate composite products prepared in Invention Examples (IE 1-IE 5) with a thickness ratio of the non-foamed polycarbonate film layer to the foamed polycarbonate layer is from 1:3 to 1:15 have relatively lower return loss (S11) and relatively higher gain (S21) for antenna at different frequencies, indicating that the polycarbonate composite articles of the present invention have improved signal penetration performance.

The invention claimed is:

1. A polycarbonate composite article for an antenna housing, comprising:
   a non-transparent foamed polycarbonate layer; and
   a non-foamed polycarbonate film layer on the foamed polycarbonate layer;
   wherein,
   the foamed polycarbonate layer comprises a polycarbonate resin, an impact modifier and an optional flame retardant;
   the non-foamed polycarbonate film layer comprises a polycarbonate resin and an optional UV stabilizer, and has a thickness in the range of 0.2-1.0 mm,
   the ratio of the thickness of the non-foamed polycarbonate film layer to the thickness of the foamed polycarbonate layer is in the range of 1:3-1:20,
   the polycarbonate composite article does not comprise an inorganic reinforcement material,
   the content of the impact modifier in the foamed polycarbonate layer is 1 wt % to 8 wt %, based on the weight of the foamed polycarbonate layer,
   the impact modifier is a silicone containing impact modifier, and
   the density of the foamed polycarbonate layer is 0.8-1.18 g/cm³.

2. The polycarbonate composite article according to claim 1, wherein the thickness of the foamed polycarbonate layer is in the range of 1.5-10 mm.

3. The polycarbonate composite article according to claim 1, wherein the thickness of the non-foamed polycarbonate film layer is 0.2-0.6 mm.

4. The polycarbonate composite article according to claim 1, wherein the polycarbonate resin used in the foamed polycarbonate layer is the same as that in the non-foamed polycarbonate film layer.

5. The polycarbonate composite article according to claim 1, wherein the polycarbonate composite article consists of the foamed polycarbonate layer and the non-foamed polycarbonate film layer.

6. The polycarbonate composite article according to claim 1, wherein the ratio of the thickness of the non-foamed polycarbonate film layer to the thickness of the foamed polycarbonate layer is in the range of 1:3-1:15.

7. A polycarbonate composite article for an antenna housing, comprising:
   a non-transparent foamed polycarbonate layer; and
   a non-foamed polycarbonate film layer on the foamed polycarbonate layer,
   wherein,
   the foamed polycarbonate layer comprises a polycarbonate resin, an impact modifier and an optional flame retardant,
   the non-foamed polycarbonate film layer comprises a polycarbonate resin and an optional UV stabilizer, and has a thickness in the range of 0.2-1.0 mm, and
   the ratio of the thickness of the non-foamed polycarbonate film layer to the thickness of the foamed polycarbonate layer is in the range of 1:3-1:20.

8. A method of preparing the polycarbonate composite article according to claim 1, comprising the steps of placing the non-foamed polycarbonate film on the inner surface of an injection mold and closing the mold to form a cavity; and forming the foamed polycarbonate layer by injecting and foaming a melted polycarbonate composition comprising a polycarbonate resin, an impact modifier and an optional flame retardant in the cavity.

9. An antenna housing comprising polycarbonate composite article according to claim 1.

10. The antenna housing according to claim 9, wherein the non-foamed polycarbonate film layer is an outer layer exposed to an external environment and the foamed polycarbonate layer is an inner layer close to an antenna.

* * * * *